United States Patent
Sugahara

(10) Patent No.: US 10,101,951 B2
(45) Date of Patent: Oct. 16, 2018

(54) IMAGE PROCESSING APPARATUS AND IMAGE PROCESSING METHOD THAT INCREASE A WIDTH OF A LINE CONSTITUTING A WHITE CHARACTER IN IMAGE DATA IN A PRINTING COLOR SAVING MODE

(71) Applicant: CANON KABUSHIKI KAISHA, Tokyo (JP)

(72) Inventor: Asako Sugahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/635,237

(22) Filed: Mar. 2, 2015

(65) Prior Publication Data
US 2015/0254032 A1    Sep. 10, 2015

(30) Foreign Application Priority Data
Mar. 10, 2014    (JP) .................................. 2014-046755

(51) Int. Cl.
*G06F 3/12*    (2006.01)
*G06K 15/02*    (2006.01)
(Continued)

(52) U.S. Cl.
CPC ......... *G06F 3/1219* (2013.01); *G06K 15/005* (2013.01); *G06K 15/1822* (2013.01);
(Continued)

(58) Field of Classification Search
CPC ........... G06T 7/40; G06T 9/00; G06T 11/001; G06K 9/00463; G06K 15/102; G06K 15/129; G06K 9/325; G06K 15/005; G06K 15/1822; G06K 15/1843; G06K 15/407; H04N 1/58; H04N 1/40087; H04N 1/00023; H04N 1/405; H04N 1/40075; H04N 1/40; H04N 1/40062; H04N 1/4092; G06F 3/1219
See application file for complete search history.

(56) References Cited

U.S. PATENT DOCUMENTS

2009/0195585 A1 *    8/2009    Satoh .................... B41J 2/2107
                                                                     347/15

FOREIGN PATENT DOCUMENTS

JP    2000-326594 A    11/2000
JP    2008-027190 A    2/2008
(Continued)

OTHER PUBLICATIONS

Communication with extended European Search Report issued by the European Patent Office in corresponding European Patent Application No. 15158289.7-1903/291451.
(Continued)

*Primary Examiner* — Huo Long Chen
(74) *Attorney, Agent, or Firm* — Fitzpatrick, Cella, Harper & Scinto

(57) ABSTRACT

An image processing apparatus includes an input unit that inputs image data. A receiving unit receives an instruction on a mode for saving color material to be consumed by printing the image data. A processing unit performs processing for increasing a width of a line constituting a white character included in image data in a case when the receiving unit receives the instruction on the mode for saving a color material to be consumed by printing.

21 Claims, 9 Drawing Sheets

(51) Int. Cl.
*G06K 15/00* (2006.01)
*H04N 1/40* (2006.01)
*H04N 1/409* (2006.01)
(52) U.S. Cl.
CPC ....... *G06K 15/1843* (2013.01); *G06K 15/407* (2013.01); *H04N 1/40* (2013.01); *H04N 1/40062* (2013.01); *H04N 1/4092* (2013.01)

(56) References Cited

FOREIGN PATENT DOCUMENTS

| | | | |
|---|---|---|---|
| JP | 2010-214665 A | | 9/2010 |
| JP | 2011-133775 A | | 7/2011 |
| JP | 2011133775 A | * | 7/2011 |

OTHER PUBLICATIONS

Korean Official Action dated Mar. 28, 2017, issued in corresponding Korean Patent Application No. 10-2015-0032355.

* cited by examiner

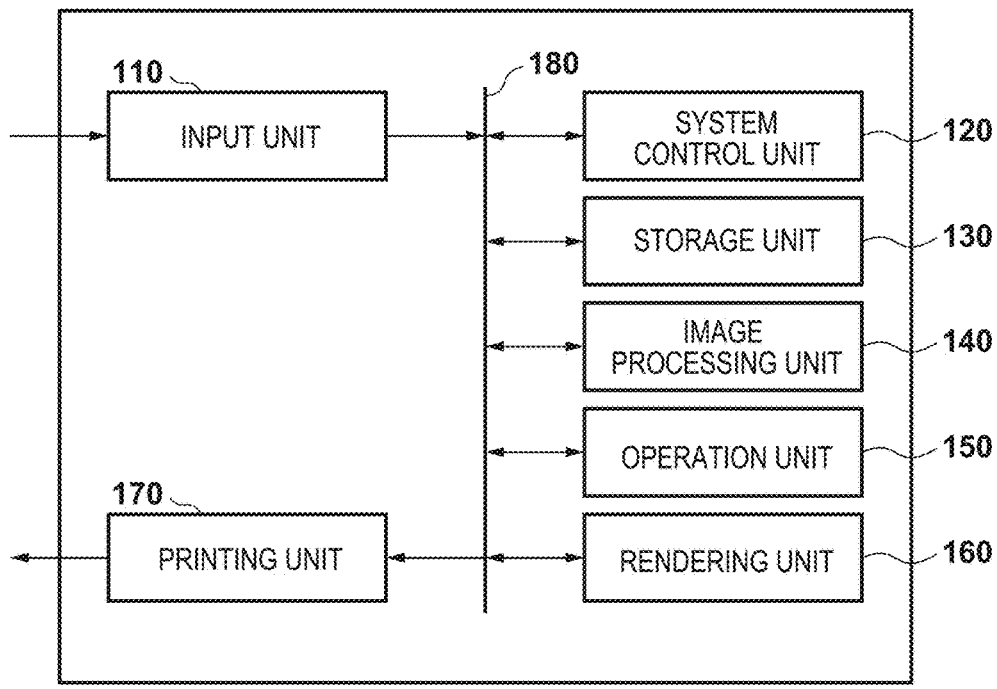
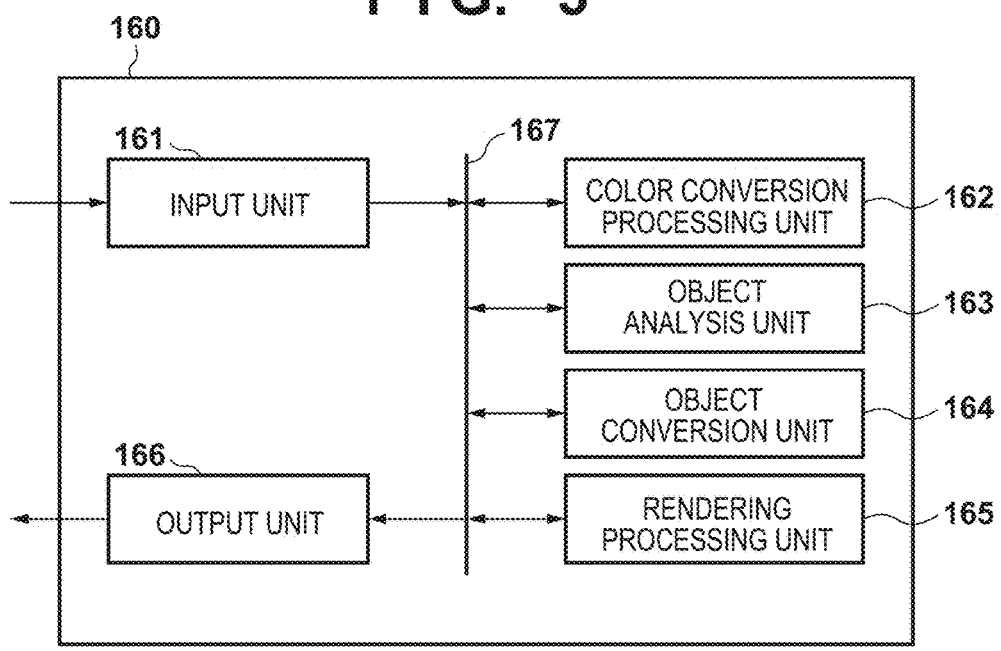

IMAGE PROCESSING APPARATUS AND IMAGE PROCESSING METHOD THAT INCREASE A WIDTH OF A LINE CONSTITUTING A WHITE CHARACTER IN IMAGE DATA IN A PRINTING COLOR SAVING MODE

CLAIM OF PRIORITY

This application claims the benefit of Japanese Patent Application No. 2014-046755, filed Mar. 10, 2014, which is hereby incorporated by reference herein in its entirety.

BACKGROUND OF THE INVENTION

Field of the Invention

The present invention relates to an image processing apparatus and an image processing method that execute color material saving processing and perform printing.

Description of the Related Art

A processing mode for suppressing the amount of color material consumption, a so-called toner saving processing, of an image forming apparatus is widely known as a function for reducing the density at the time of printing, so as to save the printing cost. Furthermore, in recent years, toner saving processing in which, not only is a density reduced, but also, technologies such as reduction or edge extraction are used is in practical use, and a method is also provided in which a user can selectively execute processing. For example, Japanese Patent Laid-Open No. 2000-326594 discloses that when a toner saving mode is on, a user can select processing for uniformly reducing the width of an image or processing for outputting only edges of an image. Furthermore, image thinning processing or image reduction processing can also be selected.

However, the invention disclosed in Japanese Patent Laid-Open No. 2000-326594 does not necessarily serve as a means for suppressing the amount of color material consumption with respect to a white character on a colored background, the white character being blank or filled with a color that is lighter than the background. When, for example, the method disclosed in Japanese Patent Laid-Open No. 2000-326594 is used to reduce the width of the white character, the white area is reduced and the colored area is increased, rather increasing the amount of color material consumption.

SUMMARY OF THE INVENTION

The present invention provides an image processing apparatus and an image processing method that realize color material saving processing with respect to a character portion and avoids width-reducing processing with respect to a white character, the width-reducing processing adversely affecting the white character.

The present invention, in its first aspect, provides an image processing apparatus comprising a processing unit that performs processing for increasing a width of a line constituting a white character included in image data in a case when a mode for saving a color material to be consumed by printing is instructed, and an outputting unit that outputs the image data processed by the processing unit for printing.

The present invention, in its second aspect, provides an image processing apparatus comprising a processing unit that performs, in a case when a mode for saving a color material to be consumed by printing is instructed, processing for reducing a width of a line constituting a character having a density that is equal to or higher than a predetermined density, or a width of a line having a density that is equal to or higher than a predetermined density, the character and the line being included in image data, and for not performing processing for reducing a width of a line constituting a white character, or a width of a white line, the white character and the white line being included in image data, and an outputting unit that outputs the image data processed by the processing unit for printing.

The present invention, in its third aspect, provides an image processing apparatus comprising a selecting unit that selects, in a case when a mode for saving a color material to be consumed by printing is instructed, whether to perform processing for increasing a width of a line constituting a white character or a width of a white line, the white character and the white line being included in image data, or to perform processing for reducing a density of a background of the white character or the density of a background of the white line, the white character and the white line being included in image data, and a processing unit for performing, on the image data, the processing selected by the selecting unit.

The present invention, in its fourth aspect, provides an image processing apparatus comprising a comparing unit that compares a brightness of a character included in image data with a brightness of a background of the character, in a case when a mode for saving a color material to be consumed by printing is instructed, and a processing unit that performs, in a case when the brightness of the character is higher than the brightness of the background as a result of the comparison by the comparing unit, processing for increasing a width of a line constituting the character.

According to the present invention, it is possible to prevent an increase in the amount of color material consumption by realizing color material saving processing with respect to a character portion and avoiding width-reducing processing with respect to a white character, the width-reducing processing adversely affecting the white character.

Further features of the present invention will become apparent from the following description of exemplary embodiments with reference to the attached drawings.

BRIEF DESCRIPTION OF THE DRAWINGS

FIG. 2 is a block diagram showing a configuration of an image processing apparatus.

FIG. 3 is a block diagram showing a configuration of a rendering section.

DESCRIPTION OF THE EMBODIMENTS

Embodiment 1

Figure 1:
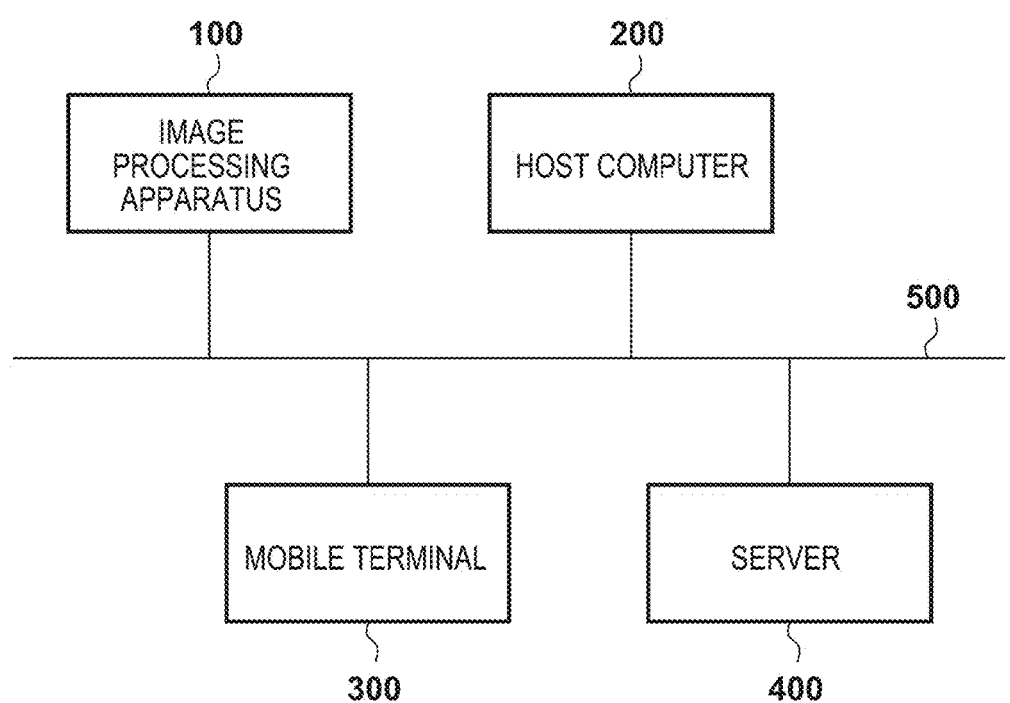
FIG. 1 is a block diagram showing a configuration of a system.

Hereafter, embodiments for implementing the present invention will be described with reference to the drawings. FIG. 1 shows a system configuration that is suitable for being applied to the present embodiment. An image processing apparatus 100 that executes image processing on input image data and outputting the processed image data, a host computer 200 that instructs printing and performs image processing using an application, a mobile terminal 300, and a server 400, are connected to each other via a network line 500. The image processing apparatus 100 is an image forming apparatus that has functions of processing image data in accordance with an instruction from the host computer 200, the mobile terminal 300, or the server 400, via the network line 500, and of printing out the processed image data. The image processing apparatus 100 is, for example, a printer. Furthermore, the image processing apparatus 100, if having the functions as a printer, may also have functions of processing image data generated by reading an original document using an image reading apparatus (not shown), and transmitting the processed image data to the host computer 200, the mobile terminal 300, or the server 400. The image processing apparatus 100 may also have a copy function of processing image data generated by reading an original document and printing out the processed image data. The present embodiment will be described, assuming that the image processing apparatus 100 performs printing in accordance with an instruction from the host computer 200, the mobile terminal 300, or the server 400. However, the present invention is not limited to this, and is also applicable to a case when the copy function is working or to a case when an original document read by an image reading apparatus (not shown) is transmitted to another image processing apparatus.

Image Processing Apparatus

FIG. 2 shows an internal configuration of the image processing apparatus 100. An input unit 110 receives various types of data transmitted from an external apparatus and inputs image data generated by an image reading apparatus (not shown) reading an original document. A system control unit 120 functions as a controller that performs overall control of the image processing apparatus 100. The image data that was input by the input unit 110 and data that is needed for processing instructed by the system control unit 120, or an operation unit 150, are communicated via a bus 180. A storage unit 130 stores the image data and information associated therewith, and includes a system work memory, and the like, in which the system control unit 120 is operated. An image processing unit 140 performs, on the image data, correction, processing, editing, and conversion processing for outputting the image data. The operation unit 150 is a device whose operation screen, operation button, and the like (that are not shown) are used for a user to perform various types of operations, and transmits information instructed in the operation to the system control unit 120. A rendering unit 160 interprets input data in a page-description language format (hereafter, referred to as PDL data) and re-configures image data that is to be output. (Note that the detail of the rendering unit 160 will be described later with reference to FIG. 3.) A printing unit 170 forms the image data converted for printing as an image on a sheet, and outputs the formed image data. Examples of this printing method include an electrophotographic method and an ink-jet method, and any method is applicable to the present embodiment. However, the present invention is more effective for a recording method in which the problem mentioned in the problem-related section occurs, that is, a method such as the electrophotographic method, the ink-jet method, and the like, that consumes the amount of a recording material that corresponds to the recording amount.

FIG. 3 shows an internal configuration of the rendering unit 160. An input unit 161 receives the PDL data that was input into the image processing apparatus 100. The image data input from the input unit 161 is communicated via a bus 167. A color conversion processing unit 162 converts the image data in the PDL data into a predetermined color space. An object analysis unit 163 acquires attribute information indicating the type of each object of the PDL data, that is, whether the object is text, an image, graphics, or the like, for example. Furthermore, the area of a target object, a signal value, position information, and the like, are analyzed to generate characteristic information that is to be needed in later processing as the need arises. An object conversion unit 164 performs image conversion processing on each object based on the analysis result obtained by the object analysis unit 163. Examples of this conversion processing include magnification changing processing for scaling a target object, density conversion processing for adjusting an output density, and the like. The conversion processing is not limited to these, and complicated processing, such as processing for varying output densities between an edge region and the remaining region, other than the edge region, may also be applied in order to suppress the amount of color material (or at least one color agent) consumption. A rendering processing unit 165 converts the image data into an output format. An output unit 166 outputs the image data converted into an output format.

Width-Reducing Processing

The following will describe the basic processing flow of the present embodiment. The present invention relates to a method for effectively performing toner saving processing on a character part of an input image. Note that a recording material is not necessarily a toner, depending on the type of a print engine, but, in the present embodiment, a description will be given assuming that the printing unit 170 is an electrophotographic unit.

Figure 4:
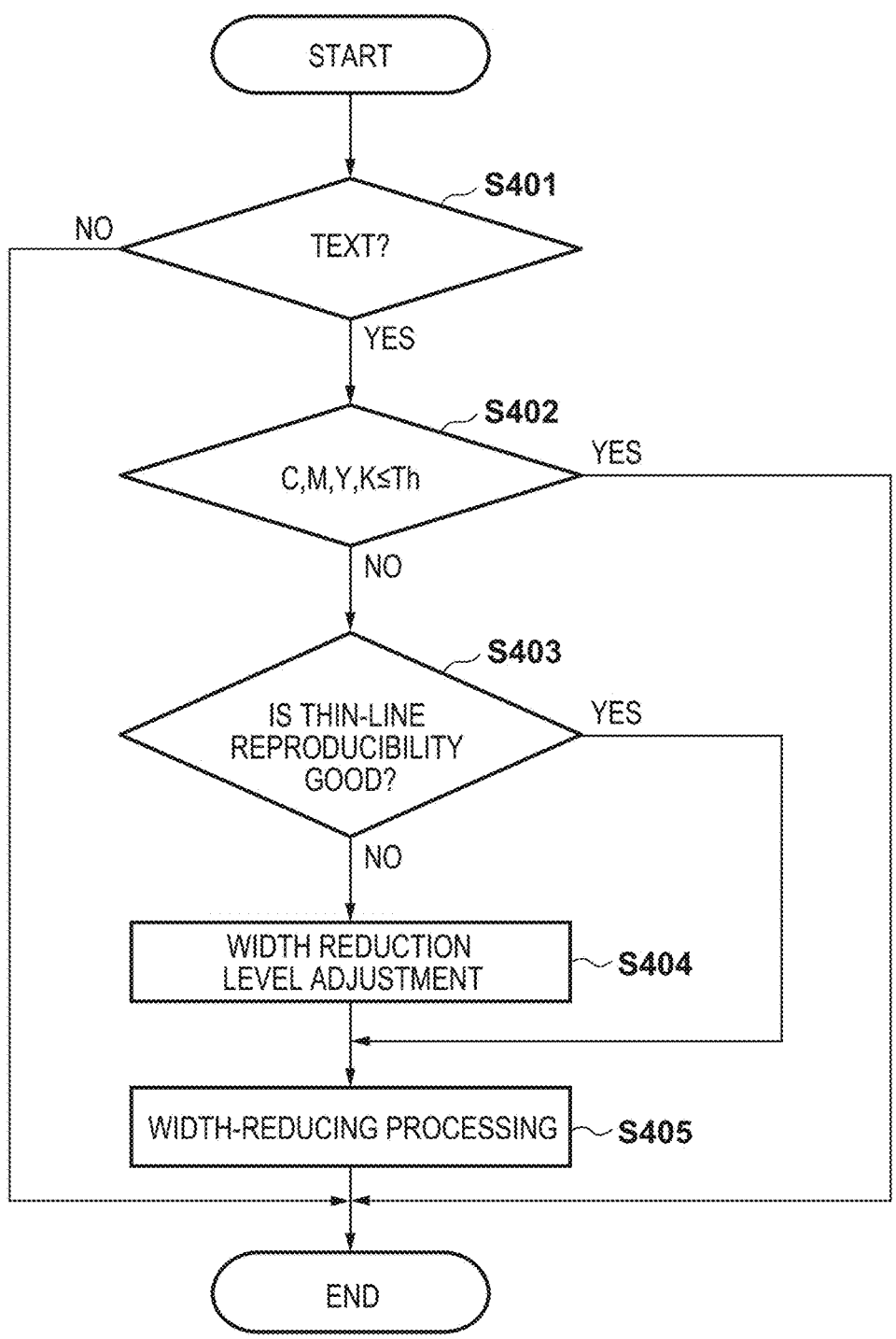
FIG. 4 is a flowchart showing the processing procedure according to Embodiment 1.

FIG. 4 is a flow showing the processing flow of the present embodiment, and the processing flow will be described in detail below. A control program for realizing the processing procedure, and the like, of FIG. 4 is stored in the storage unit 130, and is loaded on a work memory and executed by the system control unit 120 and the rendering unit 160. The system control unit 120 includes or serves as a CPU or a processor, and the control program is executed by that CPU or processor. Cooperation of the system control unit 120 and the rendering unit 160 can be realized, for example, by using a shared memory or a DMA, or by the rendering unit 160 serving as a processor, or the like. Here, the rendering unit 160 will be described taking PDL data in which an image is constituted by cyan (C), magenta (M), yellow (Y), and black (K), instead of input image data, as an example.

When print data (data to be printed) described in, for example, the page-description language (PDL) is input into the image processing apparatus 100, the system control unit 120 instructs the rendering processing unit 160 to start rendering processing with respect to an object serving as a target (an object to be subjected to the rendering processing is referred to as a target object) included in the print data. The procedure of FIG. 4 starts therewith.

In step S401, the object analysis unit 163 determines whether or not the attribute of the target object is text. If the attribute of the target object is text, it is further determined in step S402 whether or not the object is a white character. The determination whether or not the object is a white character is made based on whether or not each color of CMYK, with which the character is filled, has a value that is equal to or less than a threshold Th. For example, if Th=0 is set, it can be determined whether or not the object is a white character. Furthermore, if Th=10 is set, a character filled with a certain level of a light color can be dealt with as a white character. Here, a description will be given assuming that the characters in both the cases are white characters. If it is determined that the text object is a white character, in which each color of the text object has a value that is equal to or less than the threshold, no processing will be performed. On the other hand, if it is determined that this text object is not a white character, the rendering unit 160 notifies the system control unit 120 of this determination result, and the system control unit 120 determines, in step S403, thin-line reproducibility in the image processing apparatus 100. Thin-line reproducibility refers to the extent of how thin a line can be printed without being blurred. The thin-line reproducibility is determined by the system control unit 120, letting the printing unit 170 output a thin-line image that is stored in advance in the storage unit 130, for example. When a thin-line image is output, a density value of the thin-line is read by a post output sensor (not shown), or the like, and the system control unit 120 stores the read density value in the storage unit 130. The system control unit 120 compares the read density value with a normal time density value stored in advance in the storage unit 130, and if the read density value is lower than the normal time density value by a predetermined value or more, it is determined that the thin-line reproducibility deteriorates, and the procedure advances to step S404. However, the thin-line reproducibility test does not need to be performed by outputting a thin-line image each time of printing, rather, regularly at a timing at which a predetermined number of sheets are output. The latest density value of the thin-line or the latest determination result is stored, and this latest density value or determination result is referenced in step S403. If there is no post output sensor, an image reading apparatus (not shown) can be used to read a thin-line image, and a determination can be made in a similar fashion. The determination may be made using an appropriate method according to the configuration of the apparatus. If it is determined in step S403 that the thin-line reproducibility is good, the object conversion unit 164 executes, in step S405, text object width-reducing processing. The text object width-reducing processing refers to processing for reducing the line width of a rendered character and, for example, a parameter of the line width of text is changed to the value corresponding to the extent that the line width is reduced. The extent of the width reduction, in the case when the thin-line reproducibility is good, is predetermined in the present embodiment. If it is determined in step S403 that the thin-line reproducibility is not good, the object conversion unit 164 performs, in step S404, adjustment for attenuating the level of width reduction, and then executes, in step S405, the text object width-reducing processing. For example, in step S404, a parameter of the line width that is applied to width-reducing processing, when the thin-line reproducibility is good, is changed, such that the extent of width reduction is less. This extent to which the parameter is to be changed can also be set in advance. Note that an object whose attribute is a line can also be considered as in the case of a white character as long as the object is rendered in a white line. Although the description has been given mainly with reference to a text object, the above-described processing is effective for a line object as well.

Note that it is also possible that it is determined, in step S402, whether or not a character or line included in image data has a density that is equal to or higher than a predetermined density, and if the character or the line has a density that is equal to or higher than a predetermined density, the character or the line is subjected to the processing in step S405, instead of the processing in steps S403 and S404. Note that, in step S402, instead of processing for comparing each color value of C, M, Y, K with the threshold, processing for comparing the brightness of the character with the brightness of a background of the character may be performed, and if the brightness of the character is higher than the brightness of the background of the character, the procedure may advance to step S501.

With the foregoing procedures, it is possible to avoid width-reducing processing on a white character, and to prevent an increase in the amount of color material consumption even if a white character is included. Furthermore, when the image processing apparatus 100 includes an electrophotographic engine, it is possible to perform toner saving processing, in which the image quality is maintained, by adjusting the level of the width reduction according to the change in state of the image processing apparatus 100 due to deterioration, or the like, of a photoreceptor drum, for example. Accordingly, when the determination of thin-line reproducibility is difficult, such as, for example, when the printing unit is of an ink-jet type or when the printing unit is a single-function printer even if it is of an electrophotographic type, if it is determined in step S402 that the object is not white, the procedure may be branched to step S405.

The above-described processing is performed on all objects in the PDL data that was input into the rendering unit 160, and the image data that was converted by the rendering processing unit 165 into a bitmap data format is transmitted from the output unit 166 to the image processing unit 140. The system control unit 120 lets the image processing unit 140 perform, on the received image data, color conversion processing, and gamma conversion processing and image forming processing, taking into consideration gradation characteristics of the image processing apparatus 100, and lets the printing unit 170 print the image data subjected to the processing for suppressing the amount of color material consumption.

As described above, width-reducing processing is not performed if a text object or a line object in the PDL data is a white character, whereas width-reducing processing is performed if a text object or a line object in the PDL data is not a white character. As a result, even if an image includes a white character, it is possible to obtain a printout in which the amount of color material consumption is suppressed.

Embodiment 2

The following will describe only the differences from the foregoing Embodiment 1. The present embodiment differs from Embodiment 1, and describes a method of switching whether or not processing for increasing the width of a white character is performed, the processing being advantageous as toner saving processing. Note that the same reference numerals are given to the contents common to those of Embodiment 1, and descriptions thereof are omitted.

Figure 5:
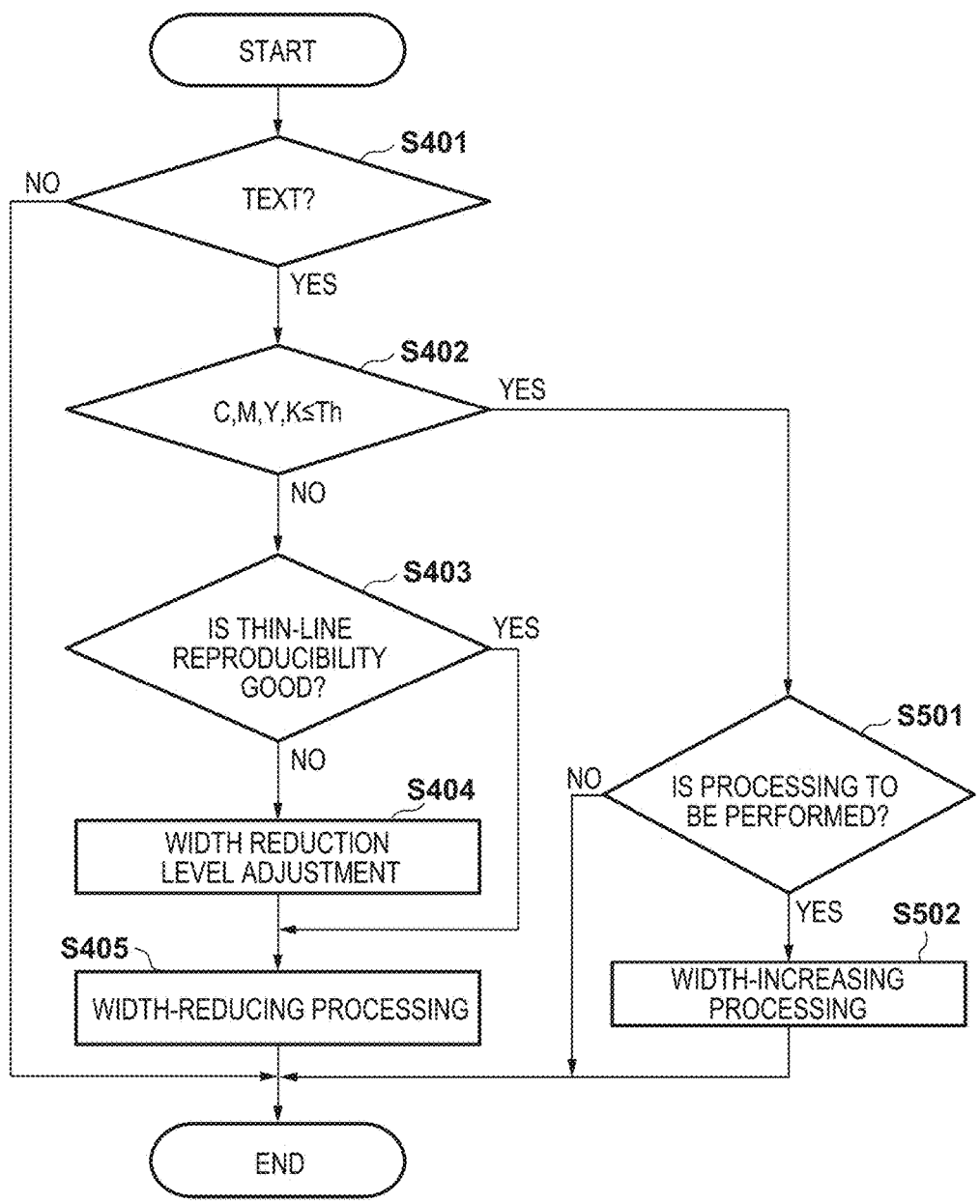
FIG. 5 is a flowchart showing the processing procedure according to Embodiment 2.

FIG. 5 is a flow showing a flow of width-reducing processing of the present embodiment. FIG. 5 corresponds to FIG. 4 of Embodiment 1. If it is determined in step S402 that the target object is a white character, it is determined in step S501 whether or not the processing is performed on the white character. A determination method will be described in detail later. Examples of toner saving processing with respect to a white character include a method of increasing the width of the character so as to increase the white area and to reduce the colored area. If it is determined in step S501 that the processing is performed on the white character, the object conversion unit 164 executes, in step S502, the processing for increasing the width of the target object. If it is determined, in step S501, that the processing is not to be performed on the white character, the processing is not performed. The toner saving processing with respect to a white character is not limited to the width-increasing processing, and any processing may be used as long as it is processing for effectively suppressing the amount of color material consumption.

Figure 6:
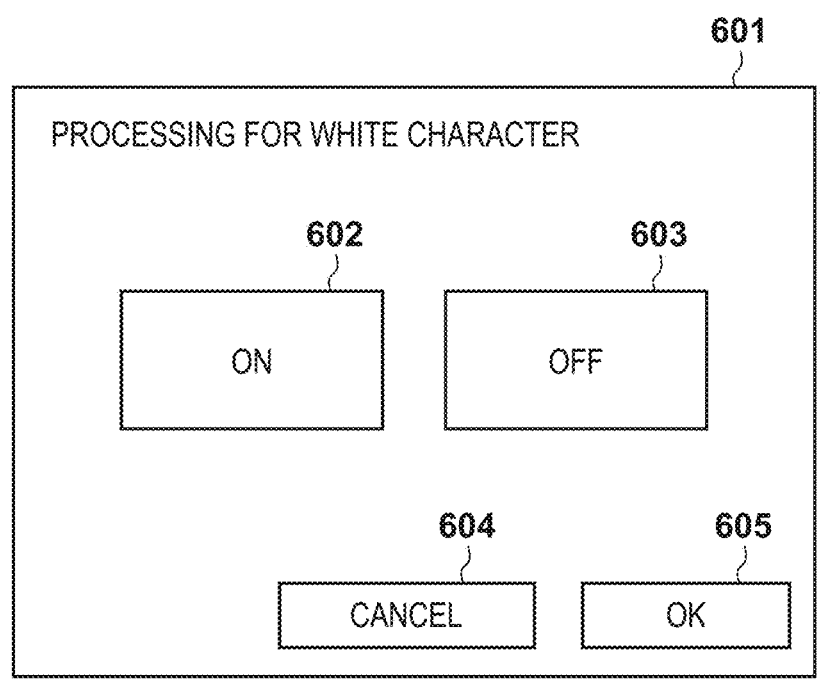
FIG. 6 shows an example of a UI screen on which processing with respect to white characters is set.

FIG. 6 shows an example of an operation screen (user interface) that is displayed on the operation unit 150 for switching processing with respect to a white character. A setting screen 601 for setting processing with respect to a white character includes buttons that a user uses to set whether or not processing is to be performed on a white character. If an ON button 602 is selected, it is determined in step S501 that the processing is to be performed on the white character. If an OFF button 603 is selected, it is determined in step S501 that the processing is not to be performed on the white character. A cancel button 604 is used to cancel the setting change to return to an arbitrary screen, and an OK button 605 is used to return to an arbitrary screen when setting is completed. Note that if there is a plurality of types of processing with respect to a white character, the setting screen may also be configured to include, in addition to the OFF button 603, a plurality of selection buttons for the respective types of processing, and lets a user select processing. The screen of FIG. 6 may be displayed on the operation unit 150 in step S501 of FIG. 5, and may receive an input from an operator to perform a determination in step S501 based on the input. Alternatively, setting, using the screen of FIG. 6, is performed separately and information on the input button is stored in advance, and a determination in step S501 may be performed with reference to the stored information.

Note that, in step S402, instead of processing for comparing each color value of C, M, Y, and K with Th, processing for comparing the brightness of the character with the brightness of the background of the character may be performed, and if the brightness of the character is higher than the brightness of the background of the character, the procedure may advance to step S501.

As described above, by enabling toner saving processing to be implemented to a white character as well, it is possible to obtain an effect of suppressing the amount of color material consumption more advantageously.

Embodiment 3

The following will describe only the differences from the foregoing Embodiment 2. The present embodiment differs from Embodiment 2, and describes a method of determining an effective one among a plurality of methods as toner saving processing with respect to a white character, and applying the method to the white character. Note that descriptions of the contents common to those of the foregoing embodiments are omitted.

Figure 7:
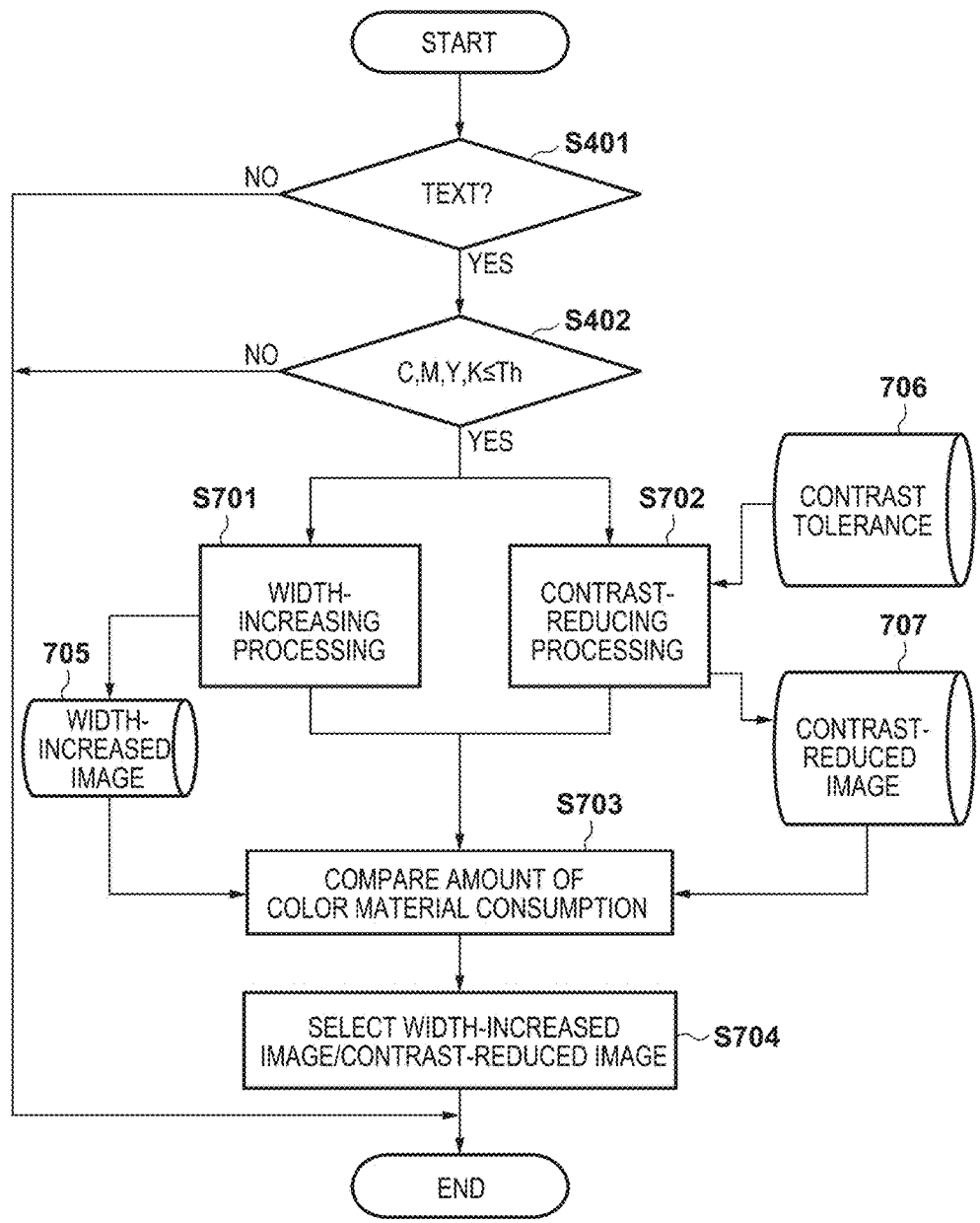
FIG. 7 is a flowchart showing the processing procedure according to Embodiment 3.
Figure 9A:
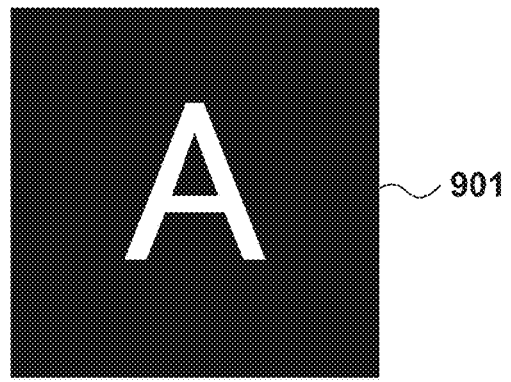
FIGS. 9A, 9B, and 9C show examples of toner saving processing with respect to a white character.
Figure 9B:
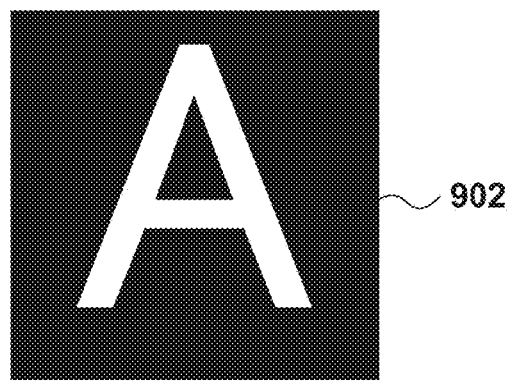
Figure 9C:
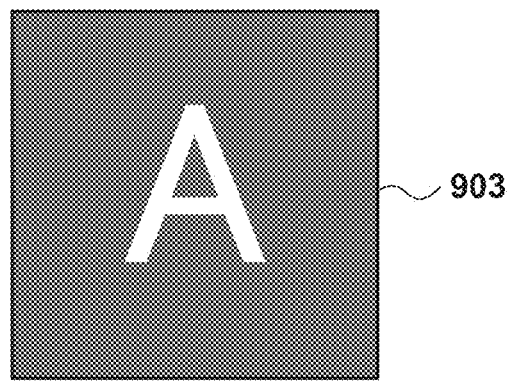

FIG. 7 is a flow showing a processing flow of the present embodiment. If it is determined in step S402 that a target object is a white character, the object conversion unit executes, in step S701, width-increasing processing and generates a width-increased image 705. At the same time, the object conversion unit executes, in step S702, contrast-reducing processing and generates a contrast-reduced image 707. Steps S701 and S702 are applied to the same input print data, and processing results are obtained independently. Specific examples of the width-increased image 705 and the contrast-reduced image 707 are described with reference to FIGS. 9A, 9B, and 9C. An image 901 of FIG. 9A is an input image, and "A" is rendered as a white character on the black background. If width-increasing processing is performed on the input image 901, a width-increased image 902 is generated (FIG. 9B). The width-increased image 902 has the white area larger than that of the input image 901, and the black region of the background is smaller than that of the input image 901, resulting in a reduction in the amount of color material consumption. The width-increased image 902 is the same as the resultant of the width-increasing processing (step S502) of Embodiment 2.

On the other hand, if the contrast-reducing processing is performed on the input image 901, a contrast-reduced image 903 (FIG. 9C) is generated. Since the contrast-reduced image 903 has the light black area of the background, the amount of color material consumption is reduced relative to that of the input image 901. In the contrast-reducing processing in step S702, the contrast-reducing processing in a user-acceptable range is executed based on a contrast tolerance 706. The contrast-reducing processing is processing for reducing, for example, the density of a background. The extent of the reduction is determined according to the contrast tolerance 706. The contrast tolerance 706 will be described later.

In step S703, the width-increased image 902 and the contrast-reduced image 903 are converted into a bitmap data format in the rendering processing unit 165, and the image data is transmitted from the output unit 166 to the storage unit 130. The system control unit 120 compares the amounts of color material consumption between the width-increased image 705 (hereafter, referred to as a width-increased bitmap image) and the contrast-reduced image 707 (hereafter, referred to as a contrast-reduced bitmap image) that are stored in the storage unit 130 in a bitmap data format. The amount of a color material that is to be consumed for each image can be calculated by summing up the CMYK signal values. For example, the sum totals of CMYK signal values between the width-increased bitmap image and the contrast-reduced bitmap image are compared, and the image having the lesser sum total can be determined as having a higher effect of suppressing the amount of color material consumption, since it is to be printed with a lesser amount of color material. Alternatively, a more exact comparison can be made by applying gamma conversion processing for each color of CMYK in the image processing unit 140, taking into consideration gradation characteristics of the image processing apparatus 100, and calculating and comparing sum totals of CMYK signal values. If it is determined that the bitmap image on which the width-increasing processing is performed has a lesser amount of a color material that is to be consumed, the system control unit 120 reads, in step S704, the bitmap image on which the width-increasing processing is performed from the storage unit 130, the image processing unit 140 processes the read bitmap image, and then, the printing unit 170 prints the image data. If it is determined that the bitmap image on which the contrast-reducing processing is performed has a lesser amount of a color material that is to be consumed, the data of the bitmap image on which the contrast-reducing processing is performed is printed in a similar manner. Although, here, an image to be output is automatically determined based on the comparison result of the amounts of a color material to be consumed, the method of selecting which image is to be output is not limited to this. For example, it is also possible that an effect of suppressing the amount of a color material that is to be consumed is presented to a user, or an image that has been subjected to toner saving processing is previewed, for example, and the user may give an instruction using the operation unit 150. Furthermore, the toner saving processing is not limited to the above-described method, as long as it is effective for a white character.

Figure 8:
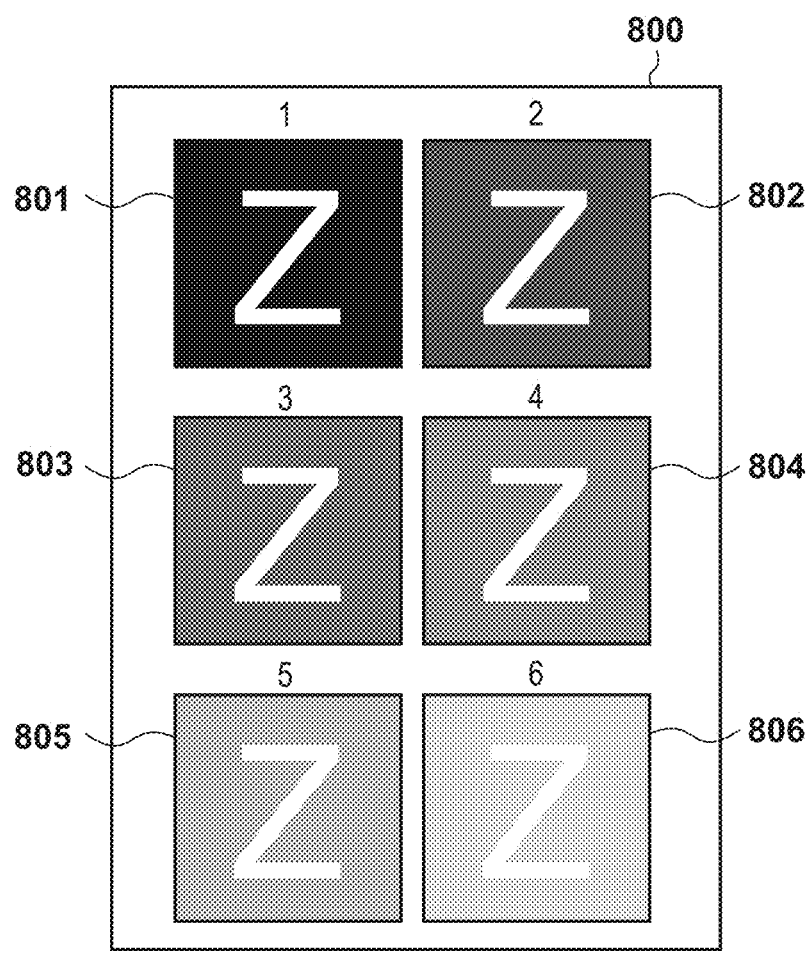
FIG. 8 shows an example of a chart for adjustment of contrast tolerance.
Figure 10A:
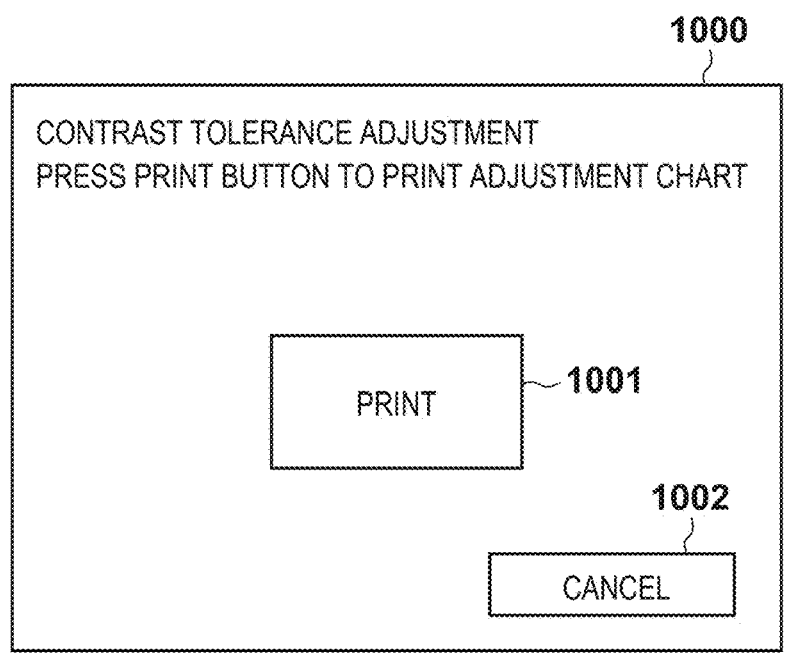
FIGS. 10A and 10B show examples of a UI screen on which contrast tolerance is adjusted.
Figure 10B:
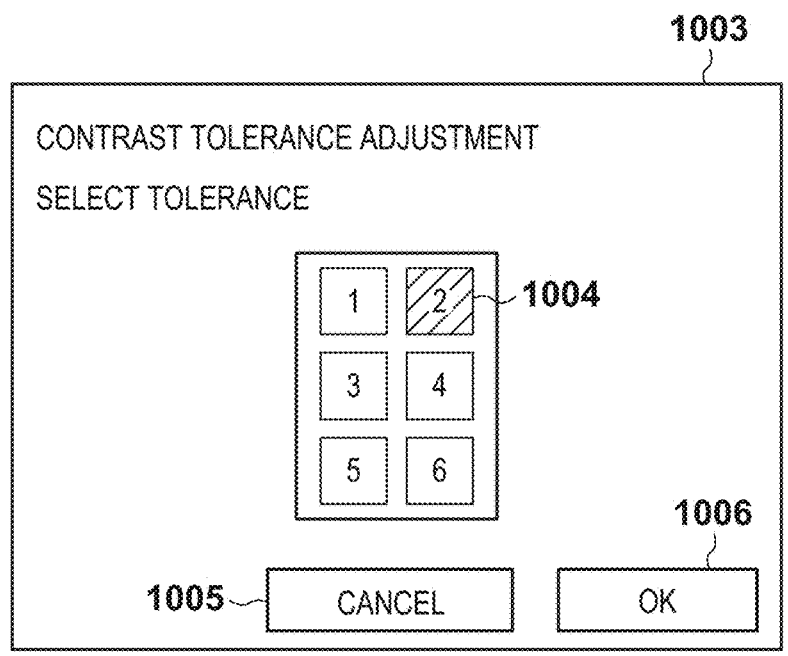

The contrast tolerance 706 will be described with reference to FIGS. 8, 10A, and 10B. An adjustment chart 800 is an example of an adjustment chart that a user uses to determine the acceptable extent of contrast. In the adjustment chart 800, six levels of images are rendered, in which levels of contrast between the white characters and the backgrounds are varied. For example, the signal values of the background are varied from an image 801 to an image 806 in the order of 255, 200, 150, 100, 50, and 30, where the image 801 is the image having the highest contrast. The image data of this adjustment chart 800 is generated in advance. FIG. 10A is an example of a screen for generating the adjustment chart 800. An adjustment screen 1000 is displayed on the operation unit 150 in accordance with a predetermined operation, and when a printing button 1001 is pressed down, the image data of the adjustment chart 800 that is stored in advance in the storage unit 130 of the image processing apparatus 100 is printed. When a cancel button 1002 is pressed down, the procedure ends without outputting the adjustment chart 800. When the adjustment chart 800 is printed, an adjustment screen 1003 shown in FIG. 10B is then displayed on the operation unit 150. Number buttons 1004 that correspond to the images 801 to 806 are provided on the adjustment screen 1003. Each number button is exclusively selectable. A user selects one of the number buttons 1004 that corresponds to the image in the acceptable range from among the output adjustment chart 800, using the operation unit 150. When an OK button 1006 is pressed down, the contrast tolerance that corresponds to the selected number button 1004 is stored in the storage unit 130. When a cancel button 1005 is pressed down, the procedure ends without storing the adjustment result. The contrast tolerance is indicated by, for example, a difference in density between a white character and a background. Accordingly, in step S702, for example, if a difference in density between the white character and the background exceeds a difference in density set as a contrast tolerance, the density of the background is reduced so as to be equal to the difference in density set as a contrast tolerance. Changing the density is preferably performed so that hue is not changed in the case of a color image. Note that the chart image, the number of samples of contrast levels, the method of outputting the chart, and the like, are not limited to these. A method in which, instead of a chart being actually output, an image such as the adjustment chart 800 is displayed on the operation unit 150 and a user performs a selection, or another method may also be used.

As described above, by performing a plurality of types of toner saving processing on a white character, and determining and applying the processing that is highly effective, it is possible to obtain an effect of suppressing the amount of color material consumption more significantly.

Furthermore, the image processing apparatus according to the foregoing embodiments may also be an electrophotographic device, an inkjet printer, a thermal printer, or the like, and the spirit of the present invention is not limited to the types of printers. Furthermore, a color material for use in printing may also be a recording material, such as a toner or an ink, and the spirit of the present invention is not limited to the types of recording materials. However, the present invention is particularly effective for a printing method such as an electrophotographic method or an ink-jet method, in which a recording material is provided separately, and that consumes the amount of the recording material that corresponds to the recording amount. Furthermore, the present invention is also advantageous as image processing at the time of not only printing, but also, data transmission.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or an apparatus by, for example, reading out and executing the computer executable instructions from the storage medium, to perform the functions of one or more of the above-described embodiment(s) and/or controlling the one or more circuits to perform the functions of one or more of the above-described embodiment(s). The computer may comprise one or more processors (e.g., a central processing unit (CPU), a micro processing unit (MPU)), and the like, and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) an interface that receives print data;
   (B) an operation device that receives a user instruction;
   (C) a memory that stores instructions; and
   (D) one or more processors that execute the instructions and cause the image processing apparatus to function as:
      (a) a setting unit that sets a toner save mode corresponding to a white character based on the user instruction via the operation device;

(b) a receiving unit that receives the print data, including at least one character, via the interface, the at least one character being constituted of at least one line; and (c) a processing unit that performs processing for increasing a width of the at least one line constituting the white character included in image data generated from the print data in a case when the setting unit sets the toner save mode for the white character, and does not perform processing for increasing a width of the at least one line constituting the white character included in the image data in a case when the setting unit does not set the toner save mode for the white character; and (E) a printing unit that forms an image based on the image data and prints the formed image.

2. The image processing apparatus according to claim 1, wherein the processing unit further performs processing for increasing a width of a white line included in the image data.

3. The image processing apparatus according to claim 1, wherein the processing unit further performs processing for reducing one of (i) a width of a line constituting a character having a density that is equal to or greater than a predetermined density, and (ii) a width of a line having a density that is equal to or greater than a predetermined density, the character and the line being included in the image data.

4. The image processing apparatus according to claim 3, wherein the processing unit adjusts a degree of the width reduction performed by the processing unit for reducing the width of the line, based on a thin-line reproducibility of an image that is printed by the printing unit.

5. The image processing apparatus according to claim 1, wherein the white character is a character whose density is equal to or less than a predetermined density.

6. The image processing apparatus according to claim 1, further comprising an outputting unit that outputs the image data processed by the processing unit, wherein the printing unit forms the image based on the image data that is output by the outputting unit.

7. The image processing apparatus according to claim 1, wherein the printing unit forms an image by one of (i) an electrophotographic method and (ii) an ink-jet method.

8. An image processing method comprising:
an input step of receiving print data via an interface;
a receiving step of receiving a user instruction via an operation device;
a setting step of setting a toner save mode corresponding to a white character based on the user instruction via the operation device;
a receiving step of receiving the print data, including at least one character, via the interface, the at least one character being constituted of at least one line;
a processing step of performing processing for increasing a width of the at least one line constituting the white character included in image data generated from the print data in a case when the setting step sets the toner save mode for the white character, and not performing processing for increasing a width of the at least one line constituting the white character included in the image data in a case when the setting step does not set the toner save mode for the white character; and
a printing step of forming an image based on the image data and printing the formed image.

9. The image processing method according to claim 8, wherein the processing step further performs processing for increasing a width of a white line included in the image data.

10. The image processing method according to claim 8, wherein the processing step further performs processing for reducing one of (i) a width of a line constituting a character having a density that is equal to or greater than a predetermined density, and (ii) a width of a line having a density that is equal to or greater than a predetermined density, the character and the line being included in the image data.

11. The image processing method according to claim 10, wherein the processing step adjusts a degree of the width reduction performed during the processing step for reducing the width of the line, based on a thin-line reproducibility of an image that is printed during the printing step.

12. The image processing method according to claim 8, wherein the white character is a character whose density is equal to or less than a predetermined density.

13. The image processing method according to claim 8, further comprising an outputting step that outputs the image data processed during the processing step,
wherein the printing step forms the image based on the image data that is output by the outputting step.

14. The image processing method according to claim 8, wherein the printing step forms an image by one of (i) an electrophotographic method and (ii) an ink-jet method.

15. A non-transitory computer-readable medium storing a program therein for causing a computer to execute a method, the method comprising:
receiving print data via an interface;
receiving a user instruction via an operation device;
setting a toner save mode corresponding to a white character based on the user instruction via the operation device;
receiving the print data, including at least one character, via the interface, the at least one character being constituted of at least one line;
performing processing for increasing a width of the at least one line constituting the white character included in image data generated from the print data in a case when the setting step sets the toner save mode for the white character, and not performing processing for increasing a width of the at least one line constituting the white character included in the image data in a case when the setting step does not set the toner save mode for the white character; and
forming an image based on the image data and printing the formed image.

16. The non-transitory computer-readable medium according to claim 15, wherein performing the processing includes increasing a width of a white line included in the image data.

17. The non-transitory computer-readable medium according to claim 15, wherein performing the processing includes reducing one of (i) a width of a line constituting a character having density that is equal to or greater than a predetermined density, and (ii) a width of a line having a density that is equal to or greater than a predetermined density, the character and the line being included in the image data.

18. The non-transitory computer-readable medium according to claim 17, wherein the processing adjusts a degree of the width reduction performed during the processing for reducing the width of the line, based on a thin-line reproducibility of an image that is printed.

19. The non-transitory computer-readable medium according to claim 15, wherein the white character is a character whose density is equal to or less than a predetermined density.

20. The non-transitory computer-readable medium according to claim 15, further comprising outputting the image data that is processed,
 wherein the image that is formed is based on the image data that is output.

21. The non-transitory computer-readable medium according to claim 15, wherein the image is formed by one of (i) an electrophotographic method and (ii) an ink-jet method.

* * * * *